(12) United States Patent
Hrinevich, Jr.

(10) Patent No.: US 6,773,681 B1
(45) Date of Patent: Aug. 10, 2004

(54) WELDLESS FLANGED CATALYTIC CONVERTERS

(75) Inventor: John Hrinevich, Jr., Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 833 days.

(21) Appl. No.: 09/630,950

(22) Filed: Aug. 3, 2000

(51) Int. Cl.[7] .............................. B01D 53/34; F01N 3/28
(52) U.S. Cl. ...................... 422/177; 422/176; 422/180; 29/890
(58) Field of Search ................................ 422/171, 177, 422/179, 180, 174, 176; 29/890; 60/299, 300

(56) References Cited

U.S. PATENT DOCUMENTS

| | | | |
|---|---|---|---|
| 4,209,495 A | * 6/1980 | Kobayashi et al. | 422/176 |
| 4,285,909 A | * 8/1981 | Mizusawa et al. | 422/180 |
| 5,408,828 A | * 4/1995 | Kreucher et al. | 422/176 |
| 6,159,430 A | 12/2000 | Foster | 422/179 |
| 6,338,827 B1 | 1/2002 | Nelson et al. | 422/186.04 |
| 6,354,903 B1 | 3/2002 | Nelson | 29/890 |
| 6,361,821 B1 | 3/2002 | Anderson et al. | 427/58 |
| 6,391,822 B1 | 5/2002 | Dou et al. | 502/325 |
| 6,438,839 B1 | 8/2002 | Hardesty et al. | 29/890 |
| 6,455,463 B1 | 9/2002 | Labarge et al. | 502/340 |
| 6,464,945 B1 | 10/2002 | Hemingway | 422/174 |
| 6,464,947 B2 | 10/2002 | Balland | 422/180 |
| 6,497,847 B2 | 12/2002 | Foster et al. | 422/177 |
| 6,532,659 B1 | 3/2003 | DeSousa et al. | 29/890 |
| 6,591,497 B2 | 7/2003 | Foster et al. | 29/890 |
| 6,605,259 B1 | 8/2003 | Henry | 422/179 |
| 6,623,704 B1 | 9/2003 | Roth | 422/179 |
| 6,624,113 B2 | 9/2003 | Labarge et al. | 502/344 |
| 6,643,928 B2 | 11/2003 | Hardesty et al. | 29/890 |

* cited by examiner

Primary Examiner—Hien Tran
(74) Attorney, Agent, or Firm—Paul L. Marshall

(57) ABSTRACT

A weldless flanged catalytic converter includes a body having an exhaust inlet end and an outlet end, and a snorkel tube disposed at one or both the exhaust inlet and outlet ends. The snorkel tube has a first end extending from the converter body and a second, distal end having a weldless flange that is integrally formed from the snorkel tube. A movable flange is disposed about the snorkel tube prior to the formation of the weldless flange. A method for preparing the weldless flanged catalytic converter includes disposing a movable flange (configured with the required tapped holes or other connecting means) over the snorkel tube of the converter. A second, weldless flange is prepared by flanging out a portion of the catalytic converter snorkel tube using appropriate metal forming techniques. In use, the weldless flange is held between the movable flange on the snorkel tube and a connecting flange from, for example, the exhaust system. In an alternate embodiment, the weldless flange includes a drawn spherical structure (i.e., ball fitting).

13 Claims, 1 Drawing Sheet

WELDLESS FLANGED CATALYTIC CONVERTERS

TECHNICAL FIELD

The present invention relates to catalytic converters and more particularly relates to weldless flanged catalytic converters and a method for preparing the same.

BACKGROUND OF THE INVENTION

It is known in the art relating to catalytic converters to connect the catalytic converter at its inlet end to an exhaust pipe, such as from an internal combustion engine, by means of a fixed flange that is welded to the catalytic converter. The welded flange on the catalytic converter inlet end is secured to a similar flange on the exhaust pipe to form a gas tight seal. FIG. 1 shows a cross-sectional fragmentary view of a typical prior art method for connecting a catalytic converter to an exhaust pipe. The catalytic converter shell 10 comprises a body portion 12 (often tubular) having an exhaust gas inlet 14. The body portion 12 tapers at the inlet 14 to form a truncated cone-shaped front portion 16. Connected to the converging end of the cone-shaped front portion 16 is a pipe piece 18 ("snorkel tube"). Alternately, the snorkel tube is formed as a part of the converter shell. A catalytic element of a honeycomb structure is disposed within the converter body and insulated and supported therein by a layer of cushion material (element and cushion or mat not shown). A flange member 20 is fixedly secured to the outer surface of the snorkel tube 18 by welding. The exhaust pipe 22 of an internal combustion engine provides a conduit for exhaust gas emitted from the combustion chambers in the engine to the converter inlet 14. The exhaust pipe 22 has on one end a flange member 24 secured to the outer surface of the exhaust pipe 22 by welding. A gasket 26 is normally placed between flanges 20 and 24 to form a gas tight seal. The exhaust pipe flange member 24 is connected to the flange member 20 on the converter snorkel tube 18 by any suitable means, such as with bolts 28 and nuts 30.

Catalytic converters may be connected to exhaust pipes and tailpipes by means of the above-described welded flanges. However, the use of such welded flanges causes the catalytic converter system to have an increased number of parts adding to the overall complexity and weight of the system. Further, use of welded flanges on the outlet and inlet snorkel tubes of the converter adds considerable expense to the manufacturing process and complexity to the assembly process. Further, the welding and machining required with such welded flanges has adverse quality implications such as warping of the converter metal, the possibility of weld imperfections, etc.

What is needed in the art is an improved catalytic converter and method for preparing the same. What is further needed in the art is an improved catalytic converter-exhaust pipe connection system. What is further needed is a catalytic converter connection system having a simplified design over currently available systems. What is further needed in the art is a catalytic converter connection system that can be produced at reduced cost and of improved quality over currently available designs.

SUMMARY OF THE INVENTION

A weldless flanged catalytic converter comprises a body having an exhaust inlet end and an outlet end and a snorkel tube disposed at one or both of the ends, the snorkel tube having a first end and a second end. The first end of the snorkel tube extends from the converter body. The second, distal end of at least one of the snorkel tubes comprises a weldless flange integrally formed from the snorkel. A movable flange is disposed about the snorkel tube between the first and second ends of the snorkel tube. In a preferred embodiment, the movable flange is disposed about the snorkel tube prior to the formation of the weldless flange.

The present weldless flanged catalytic converter provides a connection system such as to the mating flange on an exhaust pipe or a tailpipe.

The present method for preparing a weldless flanged catalytic converter comprises disposing a movable flange about the snorkel tube of the catalytic converter and forming a weldless flange from a portion of the second end of the snorkel tube. The forming may comprise any suitable technique such as drawing, rolling, forging, upsetting, or other metal forming technique.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting.

DESCRIPTION OF THE PREFERRED EMBODIMENT

Figure 2:
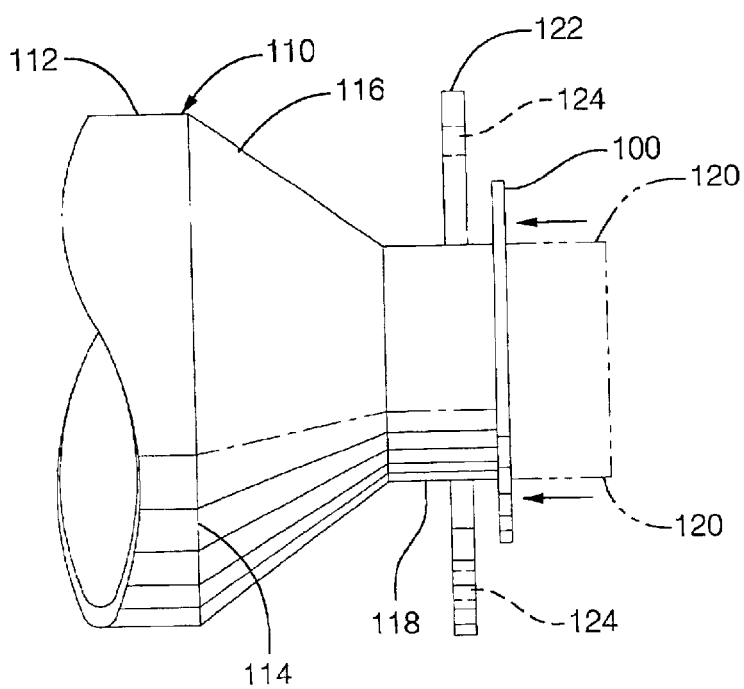
FIG. 2 shows a fragmentary transverse side view of a catalytic converter having a weldless flange in accordance with an embodiment of the present invention.
Figure 3:
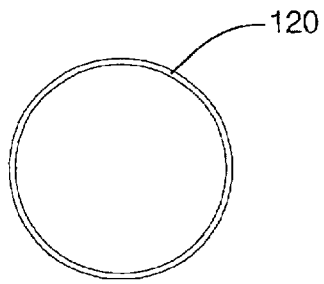
FIG. 3 shows an end view of the snorkel tube of FIG. 2 prior to forming the weldless flange.

Turning now to FIG. 2, the present weldless flanged catalytic converter is described using 100 series reference numerals. FIG. 2 shows a portion of a catalytic converter having a weldless flange 100 in accordance with one possible embodiment of the present invention. The catalytic converter 110 comprises a tubular body 112 that tapers at the inlet 114 to form a truncated cone-shaped front portion 116. Connected to the converging end of the cone-shaped front portion 116 is a snorkel tube 118. Dotted lines 120 indicate the portion of the snorkel tube 118 that is used to form the integral weldless flange 100. FIG. 3 provides an end view of the snorkel tube 118 prior to forming the flange 100.

In preparing the present weldless flanged catalytic converter, a movable flange 122 is disposed about the converter snorkel tube 118. The movable flange 122 is appropriately configured in accordance with the desired connecting means to be used. For example, the movable flange 122 in FIG. 2 has apertures 124 for connecting with a partnering flange on an exhaust pipe using nuts and bolts. The movable flange 122 may be connected to its partner by any suitable means, such as with nuts and bolts, and is configured for the desired connecting means prior to assembly about the converter snorkel tube 118.

Figure 4:
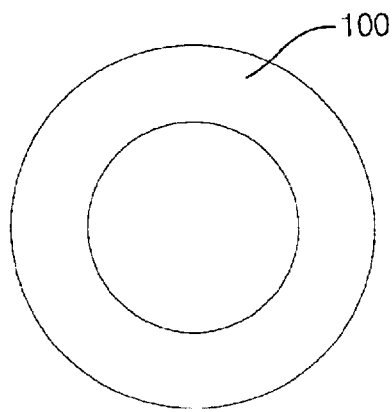
FIG. 4 shows an end view of the snorkel tube of FIG. 2 after forming the weldless flange.

The portion of the converter snorkel tube 120 is shaped (e.g., drawn) in the direction of the arrows shown in FIG. 2 into weldless, fixed flange 100. FIG. 4 provides an end view of the snorkel tube 118 after snorkel tube portion 120 has been formed into weldless flange 100. Snorkel tube 118 essentially retains the same internal dimension present prior to flanging. In another embodiment, an alternate connecting portion may be formed from converter snorkel tube portion 120. For example, a drawn spherical structure may be formed from the snorkel tube portion 120 instead of a flange 100. In the present application, the term "weldless flanged converter" encompasses flanges, spherical structures, or any other suitable structure.

Any suitable metal forming technique may be used to shape the snorkel tube portion 120 to form weldless flange 100. For example, a metal forming technique such as, but not limited to, drawing, rolling or forging may be employed to form the weldless flange 100. Transfer die technique is particularly well suited for shaping the snorkel tube to the desired shape such as a ball or a flat flared structure.

Figure 1:
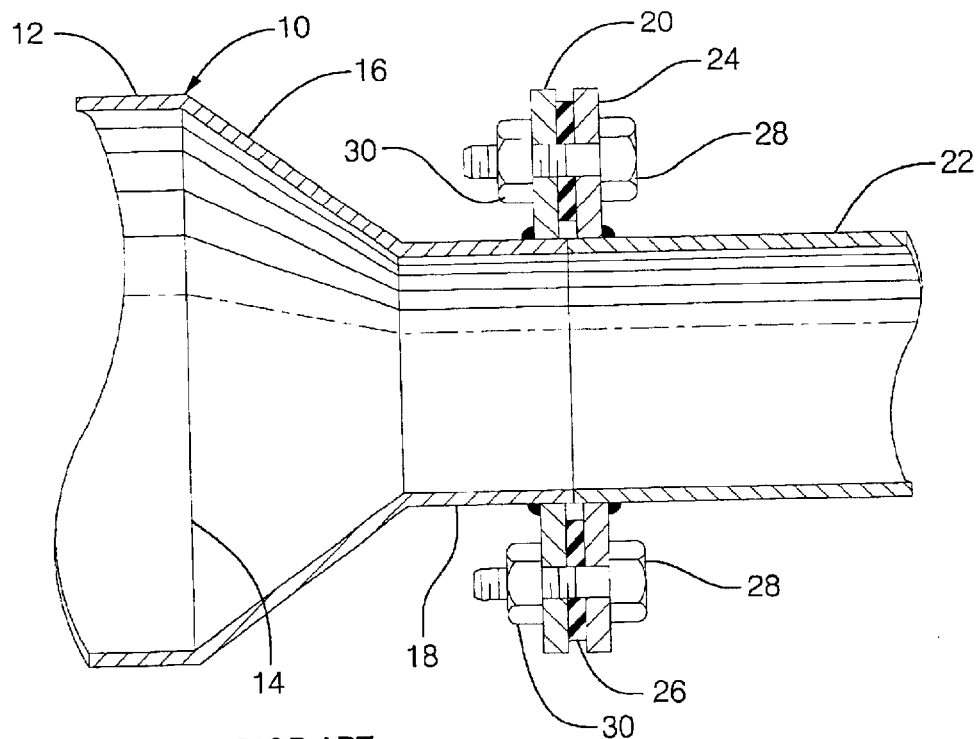
FIG. 1 (Prior Art) shows a fragmentary transverse side view of a prior art catalytic converter-exhaust pipe connection having welded flanges connecting the catalytic converter to an exhaust pipe.

In the present system for connecting a catalytic converter and an exhaust pipe of an exhaust producing device, the movable flange 122 is connected to a mating flange such as, for example, the exhaust pipe flange 24 (shown in FIG. 1). In operation, the weldless flange 100 is compressed between the movable flange 122 and the connecting mating flange, providing a gas tight seal.

While the invention is described with reference to the exhaust inlet end of the catalytic converter, the present invention encompasses disposing the weldless flanged catalytic converter on the catalytic converter outlet end, such as for connecting to a mating flange member on a tailpipe.

The present weldless flanged catalytic converter advantageously provides a substantially gas tight seal by preparing a flange or ball fitting without welding. The present invention further provides the advantages of lower cost over prior systems due to the removal of welds and less expensive or altogether eliminated machining requirements. The present invention provides the further advantage of improved quality due to the absence of metal warping caused by welding, welding defects such as ships, blowholes, or burn-through, and machining on the catalytic converter.

The present invention advantageously enhances alignment and is adaptable to space and other system constraints. For example, with prior welded flange to welded flange connections, the catalytic converter position is fixed. Thus, if the rear and front flanges of the connector are not exactly in alignment, converter installation is difficult on one of the ends. The present weldless flanged converter allows easy rotation of the flanges independent of one another, providing ready alignment. In addition, the present weldless flanged converter is easily rotated around its major axis, enabling the installer to take advantage of space considerations or avoid obstacles.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A weldless flanged catalytic converter comprising:
    a body having an exhaust inlet end and an outlet end;
    a snorkel tube disposed on at least one of said ends;
    said snorkel tube having a first end and a second end;
    said first end of said snorkel tube extending from said body;
    said second end of at least one of said snorkel tubes comprising a weldless flange integrally formed from said snorkel tube; and
    a movable flange disposed about said snorkel tube between said first end of said snorkel tube and said second end of said snorkel tube.

2. The weldless flanged catalytic converter of claim 1, wherein said weldless flange comprises a spherical structure.

3. The weldless flanged catalytic converter of claim 1, wherein said weldless flange comprises a flat flared structure.

4. The weldless flanged catalytic converter of claim 1, wherein said movable flange is disposed on said snorkel tube prior to the formation of said weldless flange.

5. The weldless flanged catalytic converter of claim 1, wherein in operation said movable flange is attached to a mating flange and said weldless flange is held between said movable flange and said mating flange.

6. The weldless flanged catalytic converter of claim 5, wherein said mating flange comprises an exhaust pipe flange, a tailpipe flange, or a combination thereof.

7. A system for connecting a catalytic converter and an exhaust pipe of an exhaust producing device comprising:
    a weldless flanged catalytic converter comprising a body having an exhaust inlet end and an outlet end;
    a snorkel tube disposed on at least one of said ends;
    said snorkel tube having a first end and a second end;
    said first end of said snorkel tube extending from said body; and
    said second end of at least one of said snorkel tubes comprising a weldless flange integrally formed from said snorkel tube wherein said movable flange is disposed between said first end of said snorkel tube and said second end of said snorkel tube;
    a movable flange disposed about said snorkel tube between said first end of said snorkel tube andd said second end of said snorkel tube;
    an exhaust pipe for directing a flow of exhaust from an exhaust producing device to said catalytic converter inlet; and
    a mating flange connected to said movable flange;
    wherein said weldless flange is compressed between said movable flange and said mating flange.

8. The system of claim 7, wherein said mating flange comprises an exhaust pipe flange, a tailpipe flange, or a combination thereof.

9. A method for preparing a weldless flanged catalytic converter comprising:
    disposing a movable flange about a snorkel tube of a catalytic converter comprising a body having an exhaust inlet end, an outlet end and a snorkel tube disposed on at least one of said ends;
    said snorkel tube having a first end extending from said body and a second end; and
    forming a weldless flange from a portion of said snorkel tube at said second end of at least one of said snorkel tubes.

10. The method of claim 9, wherein said weldless flange comprises a spherical structure.

11. The method of claim 9, wherein said weldless flange comprises a flat flared structure.

12. The method of claim 9, wherein said movable flange is disposed on said snorkel tube prior to forming said weldless flange.

13. The method of claim 9, wherein said forming comprises a metal forming technique selected from the group consisting of drawing, rolling, forging, using a transfer die, or a combination thereof.

* * * * *